(12) United States Patent
Yamazaki et al.

(10) Patent No.: US 6,980,882 B2
(45) Date of Patent: Dec. 27, 2005

(54) DISPLAY APPARATUS OF INJECTION MOLDING MACHINE

(75) Inventors: Takashi Yamazaki, Mishima (JP); Hiroshi Katsuta, Gotenba (JP); Makoto Nishizawa, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 10/694,350

(22) Filed: Oct. 28, 2003

(65) Prior Publication Data
US 2004/0088073 A1 May 6, 2004

(30) Foreign Application Priority Data
Oct. 29, 2002 (JP) .............................. 2002-314575
Sep. 26, 2003 (JP) .............................. 2003/335394

(51) Int. Cl.[7] .......................................... B29C 45/76
(52) U.S. Cl. ...................... 700/200; 700/83; 715/700
(58) Field of Search ........................... 700/83, 84, 180, 700/200, 197; 715/700

(56) References Cited

U.S. PATENT DOCUMENTS

| 5,165,012 | A | * | 11/1992 | Crandall et al. | 715/809 |
|---|---|---|---|---|---|
| 5,246,643 | A | * | 9/1993 | Inaba et al. | 264/40.1 |
| 5,430,436 | A | * | 7/1995 | Fennell | 340/7.55 |
| 5,548,535 | A | * | 8/1996 | Zvonar | 702/81 |
| 5,883,580 | A | * | 3/1999 | Briancon et al. | 340/7.52 |
| 6,072,385 | A | * | 6/2000 | Maenishi | 340/7.1 |
| 6,275,741 | B1 | * | 8/2001 | Choi | 700/200 |
| 6,311,101 | B1 | * | 10/2001 | Kastner | 700/197 |
| 6,668,209 | B2 | * | 12/2003 | Urbanek | 700/200 |
| 6,684,264 | B1 | * | 1/2004 | Choi | 710/15 |
| 2002/0138584 | A1 | * | 9/2002 | Fujimoto et al. | 709/206 |
| 2002/0152576 | A1 | * | 10/2002 | Murray et al. | 15/319 |
| 2003/0105535 | A1 | * | 6/2003 | Rammler | 700/17 |
| 2003/0229673 | A1 | * | 12/2003 | Malik | 709/207 |

FOREIGN PATENT DOCUMENTS

JP 2001-145947 5/2001

* cited by examiner

Primary Examiner—Jayprakash N. Gandhi
(74) Attorney, Agent, or Firm—Pillsbury Winthrop Shaw Pittman, LLP

(57) ABSTRACT

When text information is inputted as electronic data from an operation panel of a display apparatus, which functions as a human-machine interface of an injection molding machine, an operation panel controller of the display apparatus stores the electronic data of the inputted text information. When an instruction to display text information is emitted from the operation panel, the operation panel controller displays the stored electronic text information in the display apparatus, according to the instruction.

14 Claims, 13 Drawing Sheets

FIG. 2

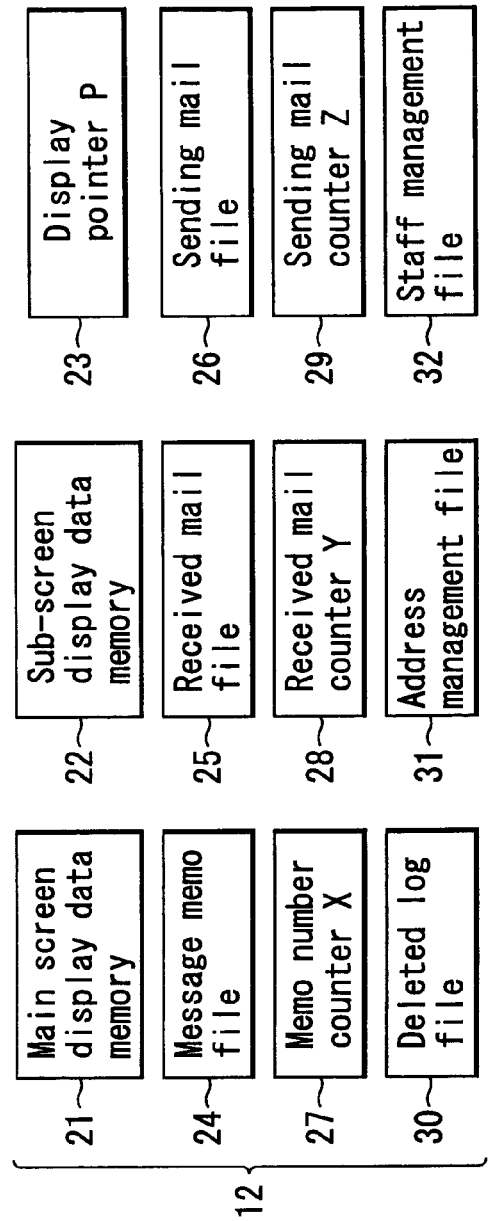

DISPLAY APPARATUS OF INJECTION MOLDING MACHINE

CROSS-REFERENCE TO RELATED APPLICATIONS

This application is based upon and claims the benefit of priority from the prior Japanese Patent Applications No. 2002-314575, filed Oct. 29, 2002; and No. 2003-335394, filed Sep. 26, 2003, the entire contents of both of which are incorporated herein by reference.

BACKGROUND OF THE INVENTION

1. Field of the Invention

The present invention relates to a display apparatus of an injection molding machine, which displays various settings of molding conditions and monitoring values of an injection molding machine.

2. Description of the Related Art

In a display apparatus which functions as a human-machine interface of a conventional injection molding machine, it is well known (Jpn. Pat. Appln. KOKAI Publication No. 2001-145947) that a display screen of a display unit is divided into two sections. One of the two sections is used as a main screen, and the other is used as a sub-screen. The main screen displays the screen display data required to set the molding conditions of an injection molding machine and the monitoring data from an injection molding machine, and the sub-screen displays various data including the monitoring data, which are to be displayed at the appropriate times independently of the main screen, so that the molding conditions and the operating status of an injection molding machine can be efficiently set and confirmed.

An operator of a conventional display apparatus writes a memo and sticks it on the frame of the apparatus or writes it on a message board, when there are important items concerning an injection molding machine that is set and monitored by that display apparatus, or there are matters to be informed to the next operator who takes over the operation.

In a plant where two or more injection molding machines are operated, when the operators of the display apparatus connected to the injection molding machines communicate with each other, the operators must not leave their display apparatus, and they use an extension telephone or send a messenger. Otherwise, the operators communicate by electronic mail through personal computers.

However, when the operator writes a memo and sticks it on the apparatus frame, an adhesive tape may peel off and the memo may be lost. There is another problem that the portion where an adhesive tape is stuck is easily soiled. When a message board is used, the message board must be set near the display apparatus. Further, when the operators communicate to one another, a communication device such as a telephone and a personal computer becomes necessary.

To solve these problems, it is considered to use software which sticks an electronic label on the display apparatus connected through the network, for example, to make communication among the operators. However, if an electronic label is stuck on the display screen, the information displayed in the screen is hidden by the label, causing en error in setting and monitoring the injection machine.

BRIEF SUMMARY OF THE INVENTION

It is an object of the present invention to provide a display apparatus of an injection molding machine, which permits certain transfer of information among the operators by using a display screen effectively without causing an error during setting and monitoring the injection molding machine.

According to one aspect of the present invention, there is provided a display apparatus of an injection molding machine, which functions as a human-machine interface, comprising an input unit which inputs text information as electronic data, a memory which stores the electronic data of the text information entered from the input unit, an instruction unit which instructs to display the text information, and a display control means which displays the text information electrified and stored in the memory in the display screen according to the instruction from the instruction unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 2 is a schematic diagram showing an example of a screen of a display unit in the embodiment;

FIG. 5 is a diagram showing a primary memory area formed in the memory of the operation panel controller;

FIGS. 6A to 6E are diagrams showing a configuration of a record stored in each file area of the memory;

DETAILED DESCRIPTION OF THE INVENTION

An embodiment of the present invention will be explained hereinafter with reference to the attached drawings.

Figure 1:
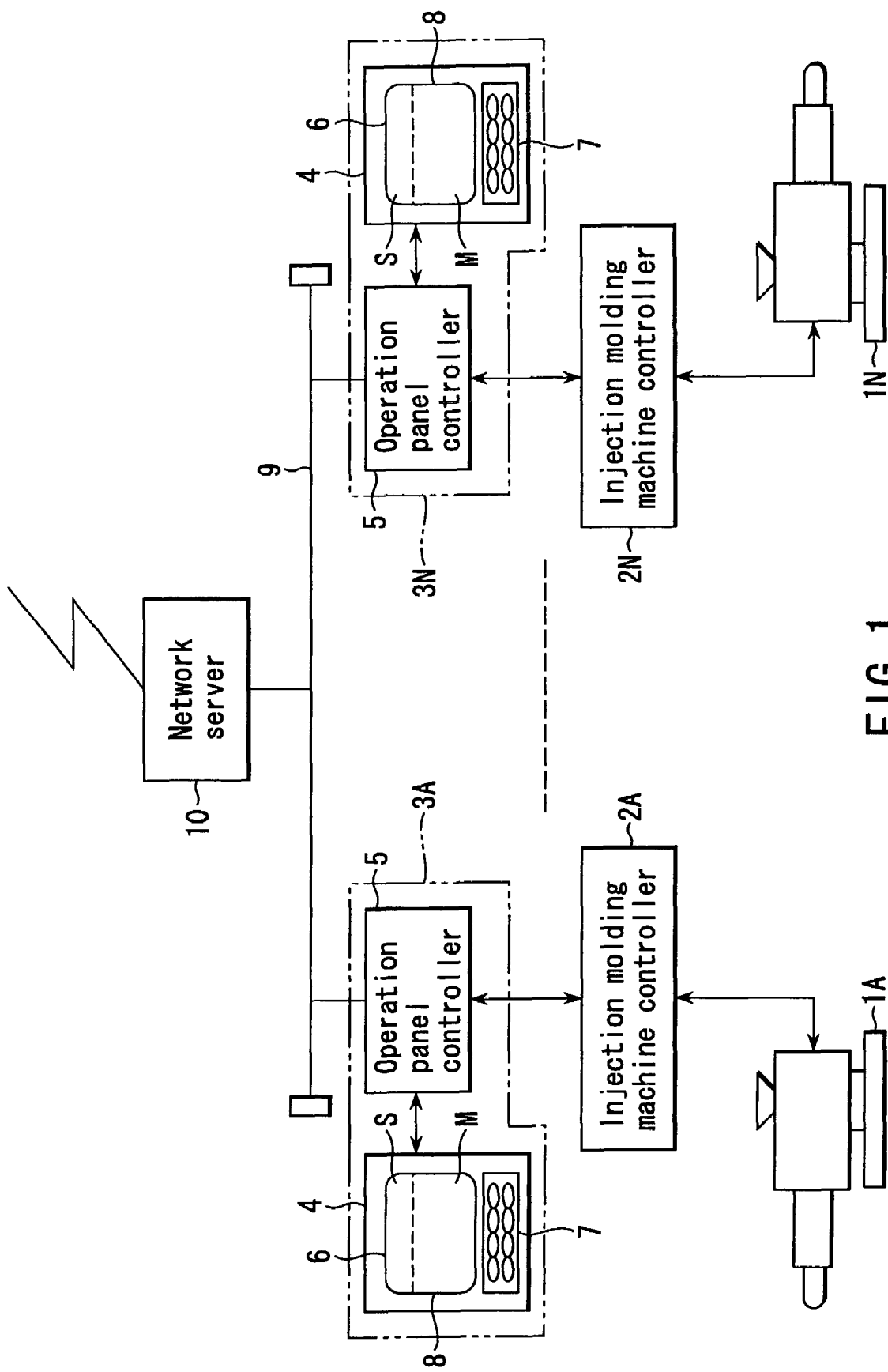
FIG. 1 a block diagram showing a system cofiguration of an embodiment of the present invention.
Figure 3:
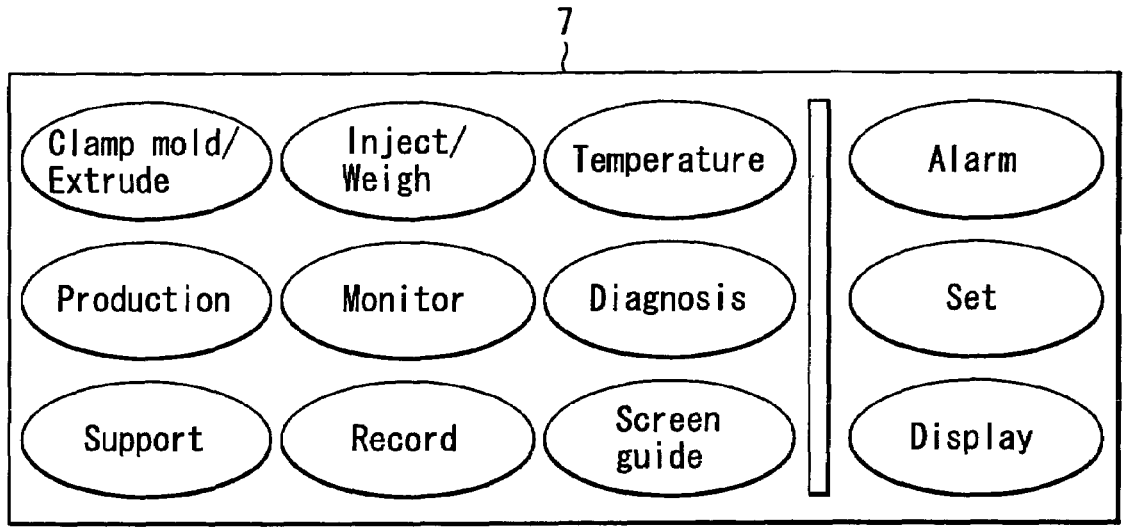
FIG. 3 is a schematic diagram showing a configuration of a keyboard of the display unit in the embodiment.

FIG. 1 is a block diagram showing the system configuration of an embodiment of the present invention. For a plurality of injection molding machines 1A–1N, injection molding machine controllers 2A–2N, which control the molding operation according to the predetermined molding conditions, and display apparatus 3A–3N, which function as a human-machine interface, are provided. Each of the display apparatus 3A–3N consists of an operation panel 4 and an operation panel controller 5.

The operation panel 4 is provided with a display unit 6 having a screen display such as a CRT display and a liquid crystal display, and a keyboard 7 having a plurality of key buttons. Over almost the whole area of the screen of the display unit 6, a touch panel sensor 8 is provided. The screen is divided into two sections in the horizontal direction in the upper half area parted by the center. The lower wide area is used as a main screen area M, and the upper narrow area is used as a sub-screen area S. The main screen area is composed as an area to set various values concerning the molding conditions of the corresponding injection machines 1A–1N, and to display the monitoring data. The sub-screen area S is composed as a selector buttons area to select various data to be displayed at the appropriate times in the corresponding sub-screen.

Figure 2:
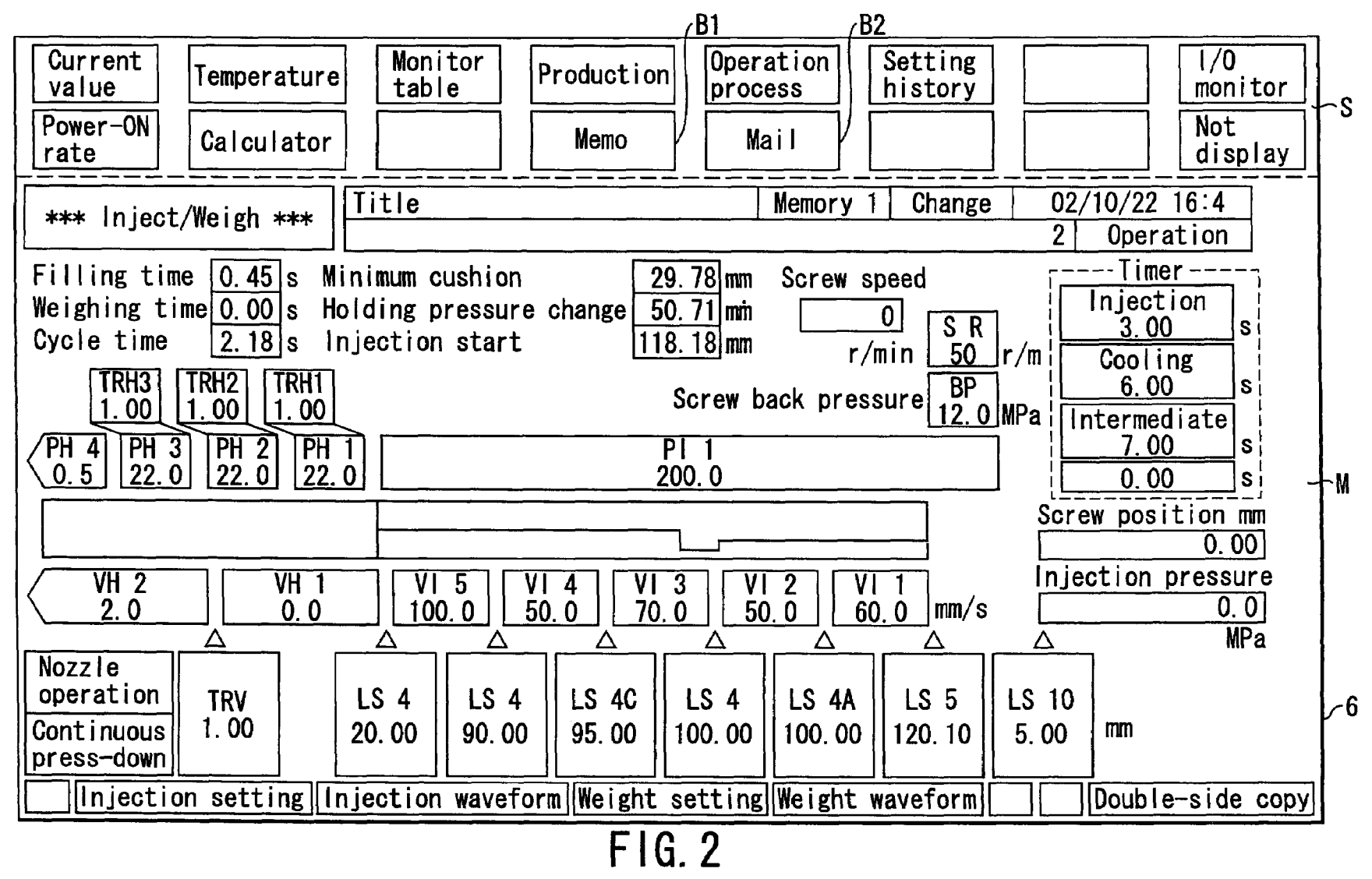

FIG. 2 is an example of the screen of the display unit 6. The main screen area M displays the menu for setting the conditions of the injection/weighing process and monitoring the operation. The sub-screen S displays various sub-screen selector buttons, such as, "CURRENT VALUE", "TEMPERATURE", "MONITOR TABLE", "PRODUCTION", "OPERATION PROCESS", "SETTING HISTORY", "I/O MONITOR", "POWER-ON RATE", "CALCULATOR", "MEMO", "MAIL" and "NOT DISPLAY". When these buttons are touched, the corresponding screen will be displayed in the sub-screen area S.

The keyboard 7 of the operation panel 4 has the buttons "CLAMP MOLD/EXTRUDE", "INJECT/WEIGH", "TEMPERATURE", "PRODUCTION", "MONITOR", "DIAGNOSIS", "SUPPORT", "RECORD", "SCREEN GUIDE", "ALARM", "SET" and "DISPLAY". When these buttons are touched, the corresponding screen will be displayed in the main screen area M.

The operation panel controller 5 is connected to the corresponding injection molding machine controllers 2A–2N to permit two-way data communication. Each operation panel controller 5 is connected with predetermined protocol through a LAN (Local Area Network) 9 to permit data communication. The LAN 9 is connected with a network server 10. The network server 10 functions as a repeater between a public line, such as a public telephone network, or a private line and the LAN 9.

Figure 4:
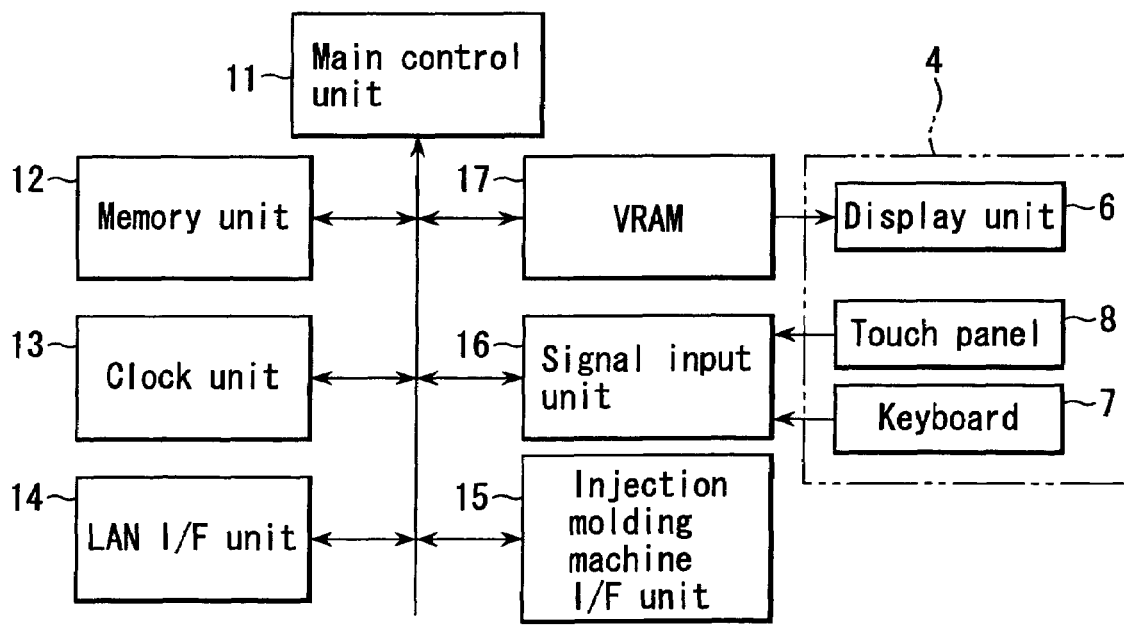
FIG. 4 is a block diagram showing a configuration of essential units of an operation panel controller in the embodiment.

FIG. 4 is a block diagram showing the configuration of the essential units of the operation panel controller 5. The operation panel controller 5 of the display apparatus 3A–3N has the same configuration. Namely, the operation panel controller 5 comprises a main control unit 11 such as a CPU (Central Processing Unit), a memory 12 such as a ROM (Read Only Memory) and a RAM (Random Access Memory), a clock 13 which keeps the current date and time, a LAN interface 14 which controls the data communication made through the LAN 9, an injection molding machine interface 15 which controls the data transfer made between the controllers 2A–2N of the corresponding injection molding machines 1A–1N, a signal input unit 16, and a VRAM (Video Random Access Memory) 17. The main control unit 11 is electrically connected with the memory 12, the clock 13, the LAN interface 14, the injection molding machine interface 15, the signal input unit 16 and the VRAM 17.

The signals from the touch panel sensor 8 and keyboard 7 are inputted to the signal input unit 16. The VRAM 17 stores the screen data displayed in the main screen area M and sub-screen area S of the display unit 6.

The operation panel controller 5 configured as above edits the information corresponding to the touched key button of the keyboard 7 based on the injection molding machine controllers 2A–2N connected to the injection molding machine interface 15, and displays them in the main screen area M of the display unit 6. The operation panel controller 5 also displays the information corresponding to the touched sub-screen selector button in the sub-screen area S of the display unit 6.

When the "MEMO" button B1 of the sub-screen selector button is touched, the message memo is displayed in the sub-screen area S. When the "MAIL" button B2 is touched, an electronic mail is displayed in the sub-screen area S. It is to be noted that the message memo is the text information created as electronic data on the operation panel 4, and is made displayable on the operation panel 4. For example, it is used to write down the items that the operator of the operation panel 4 must not neglect to perform, or write down the items to be notified to the next operator who succeeds the operation. The electronic mail means the text information created as electronic data on the operation panel 4 and made displayable on the operation panel 4 when it is sent to the other display apparatus 3A–3N connected through the LAN 9 or communication equipment such as a personal computer connected through the network server 10. It is used for example when exchanging information between the operators who operate the display apparatus 3A–3N of the injection molding machines 1A–1N and the other staff of a plant.

In the operation panel controller 5, various memory areas are formed in the memory 12 to execute the above-mentioned message memo function and electronic mail function, which include a main screen display data memory 21, a sub-screen display data memory 22, a counter memory 23 of a display pointer P, a message memo file 24, a received mail file 25, a sending mail file 26, a memo number X counter memory 27, a received mail number Y counter memory 28, a sending mail number Z counter memory 29, a deleted log file 30, an address management file 31, and a plat staff management file 32.

The main screen display data memory 21 mentioned here means the area storing the main screen display data displayed in the main screen area M of the display unit 6. The sub-screen data memory 22 means the area storing the sub-screen display data displayed in the sub-screen area S of the display unit 6.

The message memo file 24 is, a shown in FIG. 6A, the area to store a message memo record comprising a record number or a serial number beginning with 1, a creation date/time of a message memo, a data/time to display a message memo (a display start time), and a message memo text, in the ascending order of the record number. The total number of the records stored in the message memo file 24 is counted by the memo number counter X of the counter memory 27.

The received mail file 25 is, as shown in FIG. 6B, the area to store a received mail record comprising a record number which is a serial number beginning with 1, a date/time to receive an electronic mail, a time to display the electronic mail (a display start time), a sender of an electronic mail, a title of an electronic mail and a mail text, in the ascending order of the record number. The total number of the records stored in the received mail file 25 is counted by the received mail counter Y of the counter memory 28.

The sending mail file 26 is, as shown in FIG. 6C, the area to store a sending mail record comprising a record number which is a serial number beginning with 1, a date/time to create an electronic mail, a destination address of an electronic mail, a time to display an electronic mail (a display start time), a sender of an electronic mail, a received mail record comprising a title of an electronic mail and a mail text, in the ascending order of the record number. The total number of the records stored in the sending mail file 26 is counted by the sending mail counter Z of the counter memory 29.

The above-mentioned deleted log file 30 is the area to save the records deleted from the message memo file 24, the received mail file 25 and the sending mail file 26.

The address management file 31 is, as shown in FIG. 6D, the area to store an address management record comprising a record number which is a serial number beginning with 1, names of injection molding machines assigned previously to the injection molding machines 1A–1N, MAC addresses that are the specific transfer identification addresses set previously to the LAN interface 14 of the operation panel controller 5 corresponding to the injection molding machines 1A–1N, and an IP address, in the ascending order of the record number.

The plant staff management file 32 is, as shown in FIG. 6E, the area to store a staff code comprising a record number which is a serial number beginning with 1, a unique staff code assigned to each staff member, and the name and section of each staff, in ascending order of record number.

Figure 7:
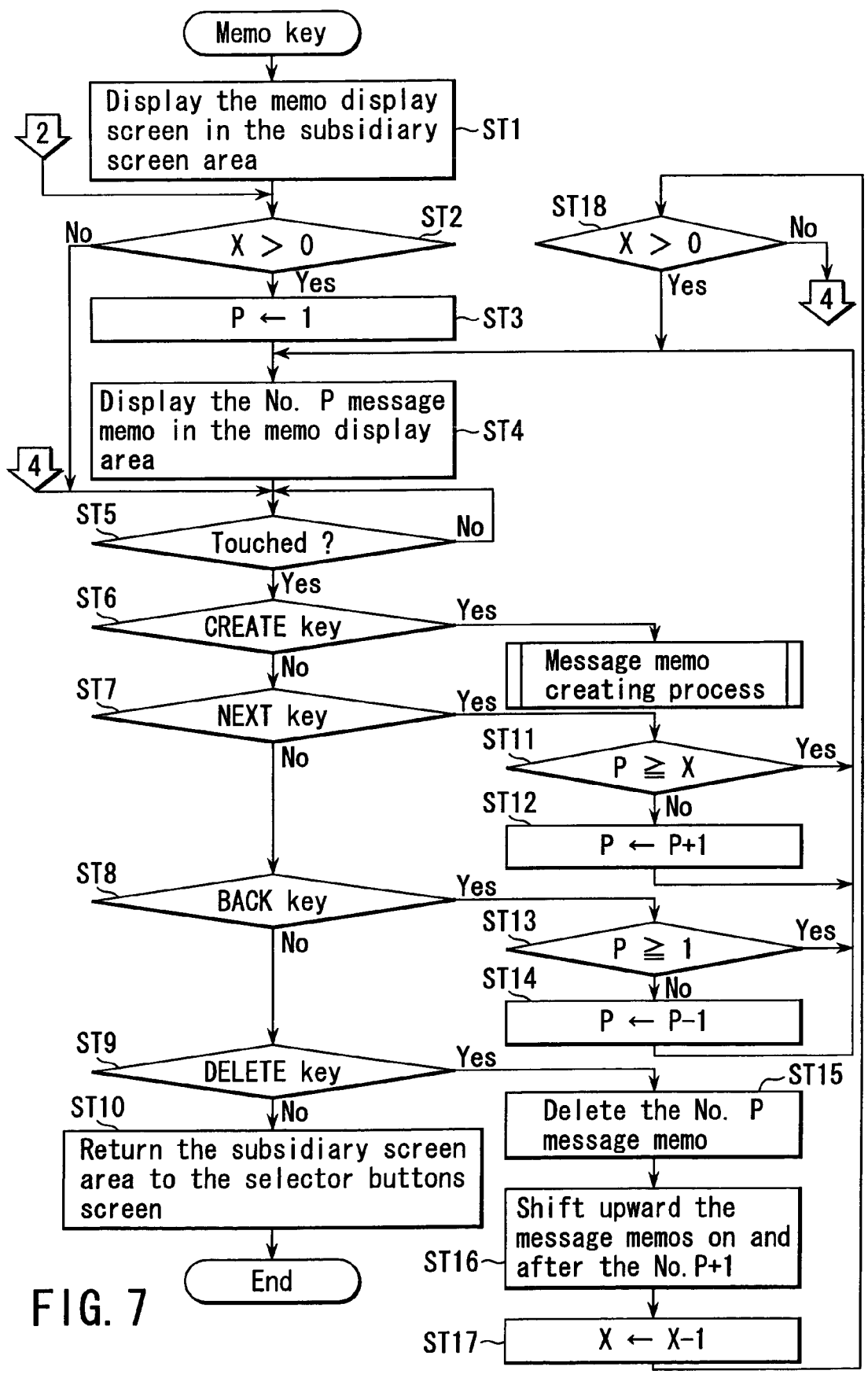
FIG. 7 is a flowchart showing the primary steps of the memo key operation executed by the main control unit of the operation panel controller.

The main control unit 11 of the operation panel controller 5 is programmed to execute the memo key function shown in the flowchart of FIG. 7 to realize the message memo function of the display apparatus 3A–3N, when the depression of the "MEMO" button B1 displayed in the sub-screen area S of the display unit 6 is detected by the signal inputted from the touch panel sensor 8 to the signal input unit 16.

Figure 14:
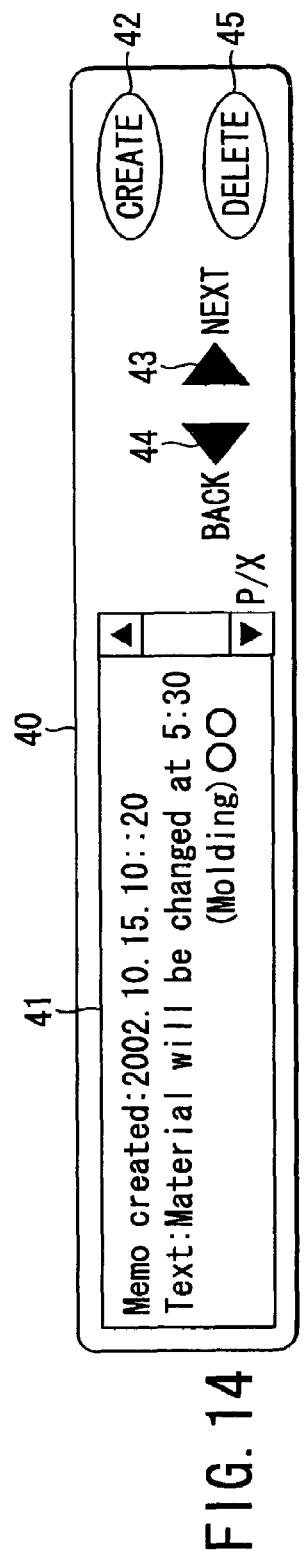
FIG. 14 is a view showing an example of a memo display screen.

As a fist step (hereinafter referred to as ST), the main control unit 11 reads the memo display screen data from the sub-screen display data memory 22, and displays a memo display screen 40 configured as shown in FIG. 14, in the sub-screen area S of the display unit 6.

The memo display screen 40 comprises a memo display area 41 to display the memo creation date/time and a message text, a CREATE key 42, a NEXT key 43, a BACK key 44, and a DELETE key 45. The memo display area 41 permits the operator to see even a long message by scrolling the screen by a scroll bar. The "P/X" on the right side of the memo display area 41 indicates that the message memo displayed in the memo display area 41 is the message memo of the Pth (the value of the display pointer P) record among the total number X (the value of the memo number counter X) of the message memo records stored in the message memo file 24.

Next, at ST2, the main control unit 11 checks whether the memo number counter X is larger than "0". When the memo number counter X is larger than "0", the main control unit sets the display pointer P to "1", as ST3. As ST4, the main control unit reads the 1st message memo record from the message memo file 24, and display the creation data/time of this record and the message memo text in the memo display area 41. Therefore, the operator of the operation panel 4 can display the message memo of the first record stored in the message memo file 24 in the memo display area 41 of the sub-screen area S, by touching the "MEMO" button B1.

The "MEMO" button B1 functions as a commander to command to display text information. The message memo file 24 functions as a memory to store the electronic data of text information. The main control unit 11 functions as a display controller to display the text information electrified and stored in the memory in the sub-screen area S, according to the command from the commanding means. The text information mentioned here means the information represented by characters.

When the memo number counter X is "0" in ST2, the steps ST3 and ST4 will not be executed.

Next, the main control unit 11 waits for the sub-screen area S to be touched at ST5. When the touching of any part of the sub-screen S is detected by the signal from the touch panel sensor 8 input to the signal input unit 16, the main control unit 11 checks whether any of the keys 42–45 of the memo display screen is touched at ST6–ST9, or the other area is touched. When the area other than the keys 42–45 is touched, the main control unit 11 resets the sub-screen area S to the sub-screen selector button display screen, as shown in FIG. 2, at ST10, and terminates the memo key operation. Therefore, the operator can finish the display of message memo by touching the sub-screen area S other than the keys 42–45, after confirming the message memo.

Contrarily, when the NEXT key 43 is touched, the main control unit 11 checks as ST11 whether the value of the display pointer P is larger than the value of the memo number counter X. When the value of the display pointer P is smaller than the value of the memo number counter X, the main control unit increases the value of the display pointer P by "1", at ST12, returns to ST4, reads the Pth message memo record from the message memo file 24, and displays the creation date/time of this record and the message memo text in the memo display area 41. When the value of the display pointer P is larger than the value of the memo number counter X, the main control unit returns to ST4 without changing the value of the display pointer P. Therefore, the operator can sequentially display in ascending order (in the order of the creation date and time) the message memo stored in the message memo file 24 by touching the NEXT key 43.

When the BACK key 44 is touched, the main control unit 11 checks at ST13 whether the value of the display pointer P is smaller than "1". When the value of the display pointer P is larger than "1", the main control unit decreases the value of the display pointer P by "1", at ST14, returns to ST4, reads the Pth message memo record from the message memo file 24, and displays the creation date/time of this record and the message memo text in the memo display area 41. When the value of the display pointer P is smaller than "1", the main control unit returns to ST4 without changing the value of the display pointer P. Therefore, the operator can sequentially display in descending order (in the reverse order of the creation date and time) the message memo stored in the message memo file 24 by touching the BACK key 44.

When the DELETE key 45 is touched, the main control unit 11 deletes the Pth message memo record from the message memo file 24 at ST15. Then, the main control unit sequentially shifts the message memo records on and after the (P+1)th upward (in the smaller number direction) at ST16. Thereafter, the main control unit decreases the value of the memo number counter X by "1", as ST17, moves to ST18, and checks whether the value of the memo number counter X is larger than "0". When "Yes" is judged at ST18, flow moves to ST4, when "No" is judged at ST18, flow moves to ST5. Thereafter, the operator can delete the message memo record displayed in the memo display area 41 from the message memo file 24 by touching the DELETE key 45. After the record is deleted, the message memo of the record stored next to that record will be displayed in the memo display area 41. The deleted message memo record is saved in the deleted log file 30, and can be checked later.

Figure 8:
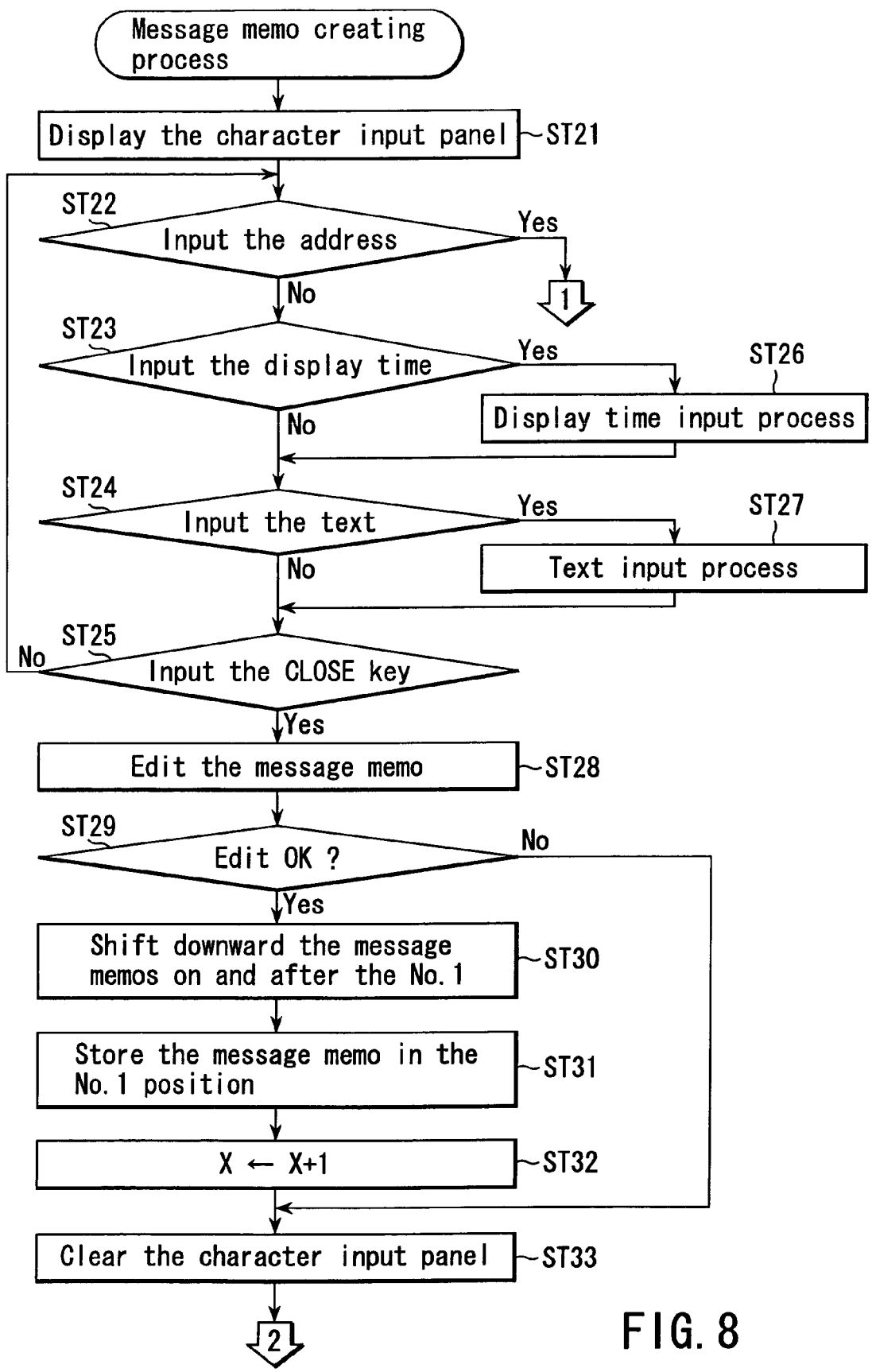
FIG. 8 is a flowchart showing concretely the message memo creating process in the memo key operation.
Figure 15:
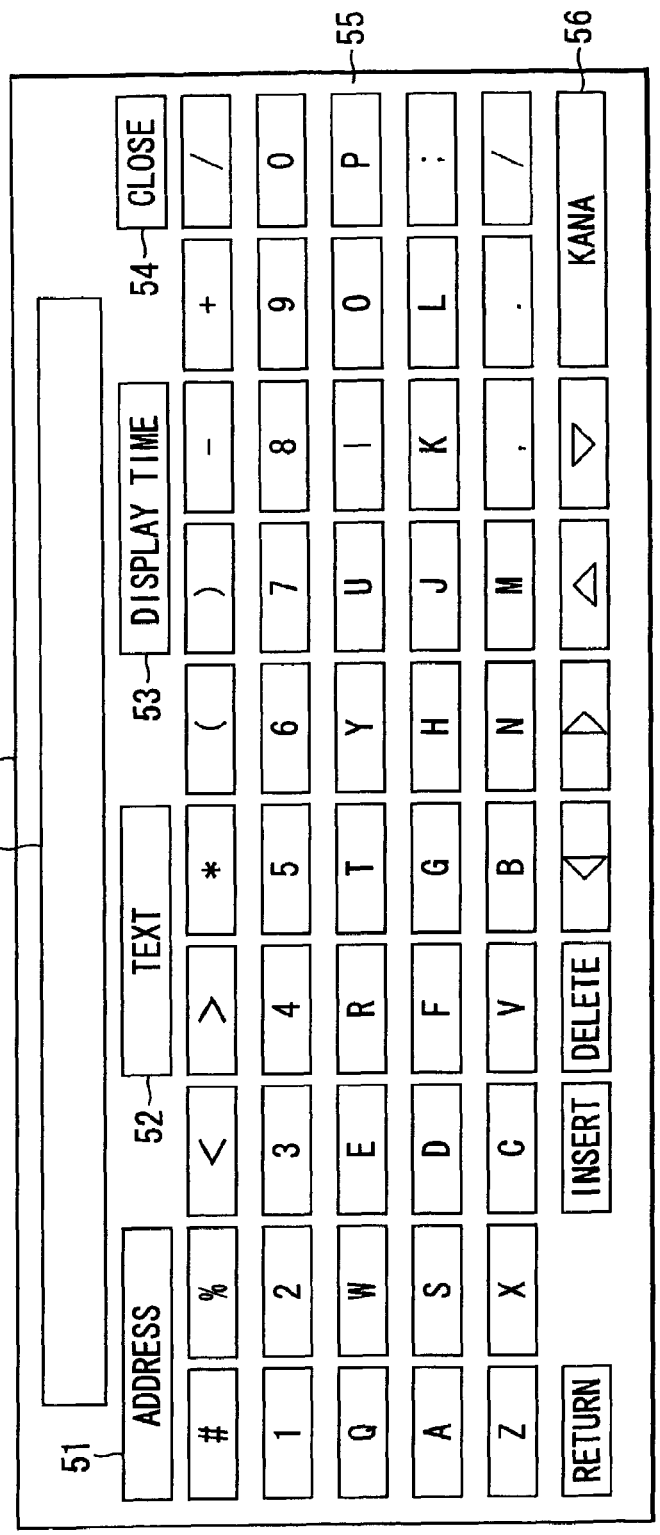
FIG. 15 is a view showing an example of a character input panel.

When the CREATE key 42 is touched, a message memo creation process is executed as concretely shown in the flowchart of FIG. 8. Namely, the main control unit 11 displays a character input panel 50 as shown in FIG. 15 over the main screen area M.

The character input panel 50 comprises function keys of ADDRESS key 51, TEXT key 52, DISPLAY TIME key 53 and CLOSE key 54, and character keys 55 including symbols, figures and alphabets. The character keys 55 can be changed to a HIRAGANA keyboard layout by touching the KANA key 56. The character input panel 50 includes an input information display area 57 to display the input information of the character keys 55.

Next, at ST22–ST25, the main control unit 11 waits for depression of any function key 51–54 of the character input panel 50. When the depression of the ADDRESS key 51 is detected by the signal inputted from the touch panel sensor 8 to the signal input unit 16, the main control unit jumps to ST66 of creating a sending mail (FIG. 10), as explained later.

Contrarily, when the depression of a DISPLAY TIME key 53 is detected, the main control unit 11 executes the display time input process at ST26. This process is to take in the digits (hour: minute) entered from the character keys 55 as a message memo display start time.

When the depression of the TEXT key 52 is detected, the main control unit 11 executes the text input process at ST27. This process is to take in the character, digit and symbol entered from the character keys 55, as a message memo text.

Contrarily, when the depression of the CLOSE key 54 is detected, the main control unit 11 edits a message memo data having creation date/time, display time and memo text, at ST28. The creation date/time is the current date/time indicated by the clock 13. The display time is the time of the time data when the time data has been taken in by the display time input process of ST26, and "0" otherwise. The memo text is the character information when the character information has been taken in by the text input process of ST27, and causes an edition error otherwise.

The main control unit 11 checks at ST29 whether the message memo data is edited or not. When the message memo data is edited, the main control unit at ST30 and ST31 sequentially shifts the message memo records on and after the 1st record in the message memo file 24 downward (in the larger number direction), stores the edited message memo data in the empty 1st record position, and increases the value of the memo number counter X by "1", at ST32. When the message memo data is not edited, the steps ST30–ST32 will not be executed. Thereafter, the main control unit clears the character input panel 50, and returns to the memo key process (FIG. 7) of ST2.

Therefore, the operator can enter a message memo as electronic data from the character input panel 50 by touching the CREATE key 42 in the memo display screen 40. The message memo record is stored in the message memo file 24. The message memo text of the message memo record stored in the message memo file 24 is displayed in the memo display area 41 of the memo display screen 40, which is displayed in the sub-screen area S. Therefore, the memo creator can check whether the memo contents are correct, by monitoring the memo display area 41.

The touch panel sensor 8 functions as an input unit to input text information as electronic data in relation to the message memo creating process of the main control unit 11.

Next, explanation will be given to the electronic mail function of the display apparatus 3A–3N.

Figure 9:
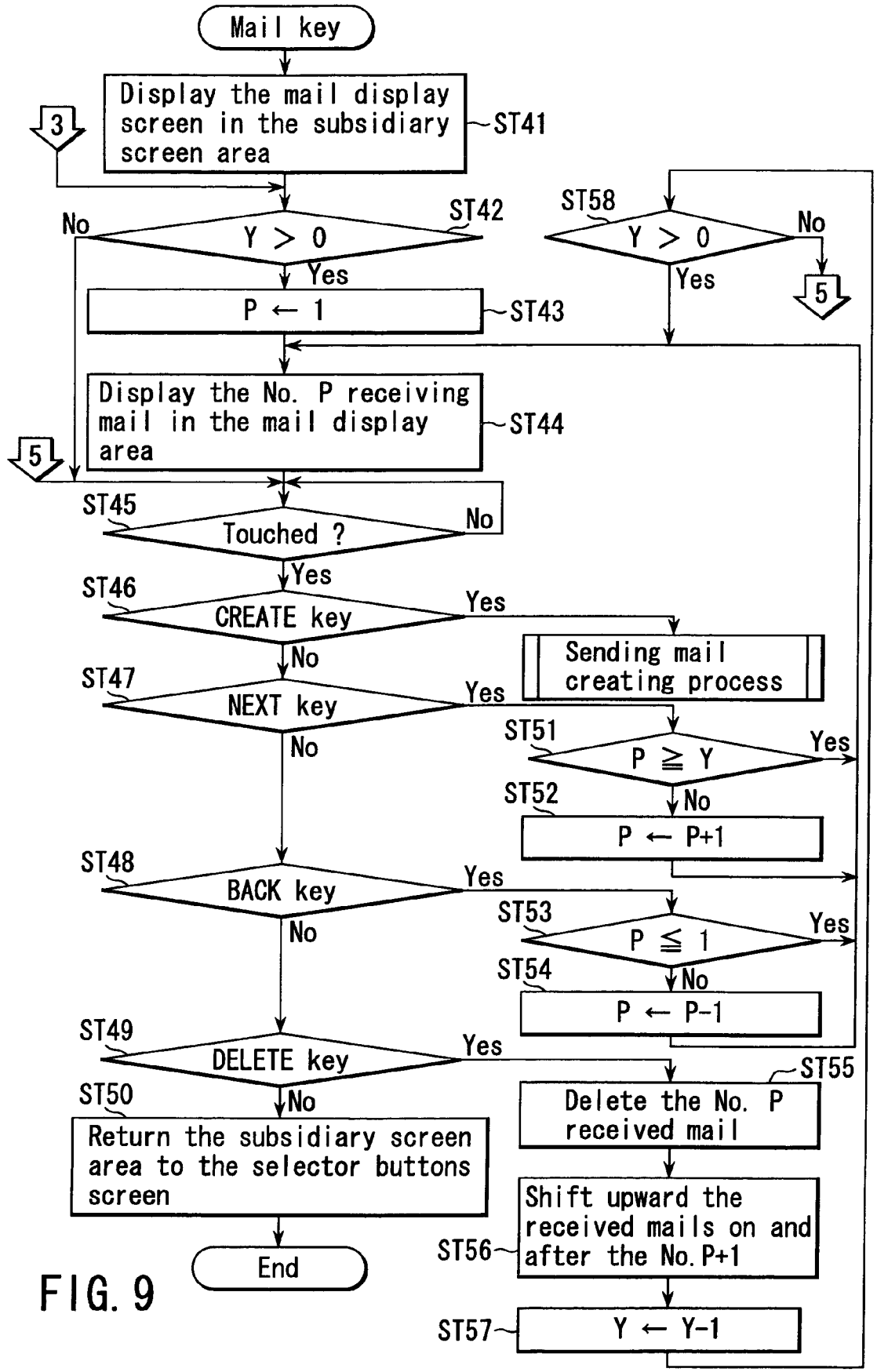
FIG. 9 is a flowchart showing the primary steps of the mail key operation executed by the main control unit of the operation panel controller.

The main control unit 11 of the operation panel controller 5 is programmed to execute the mail key process shown in the flowchart of FIG. 9, when the depression of the MAIL button B2 displayed in the sub-screen area S of the display unit 6 is detected by the signal inputted from the touch panel sensor 8 to the signal input unit 16.

Figures 16, 17, 18:
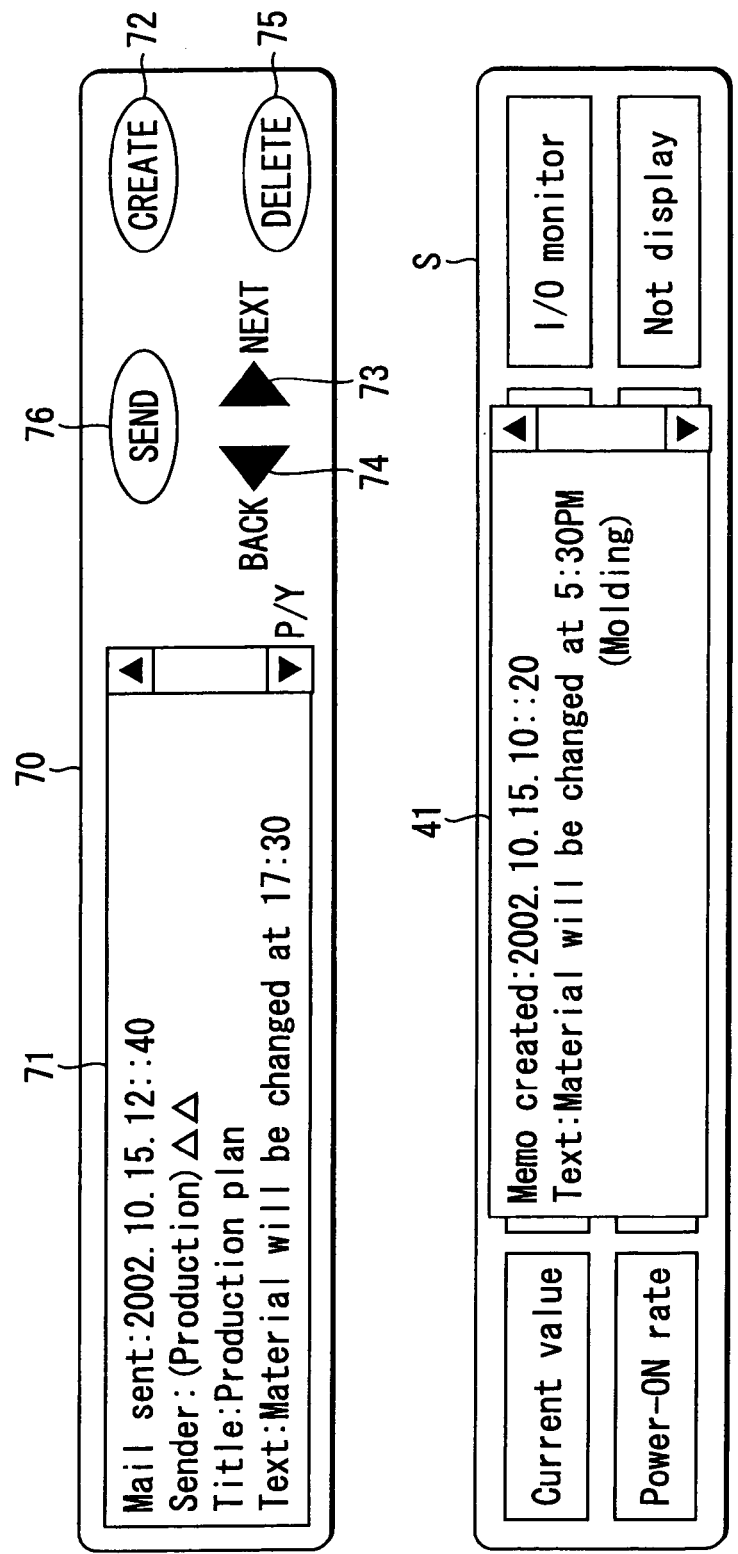
FIG. 16 is a view showing an example of a mail display screen.
FIG. 17 is a view showing an example of a mail sending screen.
FIG. 18 is a view showing a display example of a memo display area.

At a first step, the main control unit 11 reads the mail display screen data from the sub-screen display data memory 22, and displays a mail display screen 60, as shown in FIG. 16, in the sub-screen area S of the display unit 6.

The mail display screen 60 comprises a mail display area 61 to display the mail reception date/time, sender, title and text, and a CREATE key 62, a NEXT key 63, a BACK key 64, and a DELETE key 65. The mail display area 61 permits the operator to see even a long message by scrolling the screen by a scroll bar. The "P/Y" on the right side of the mail display area 61 indicates that the received mail displayed in the mail display area 61 is the received mail of the Pth (the value of the display pointer P) record among the total number Y (the value of the received mail counter Y) of the received mail records stored in the received mail file 25.

Next, at ST42, the main control unit 11 checks whether the received mail counter Y is larger than "0". When the received mail counter Y is larger than "0", set the display pointer P to "1", as ST43. At ST44, the main control unit reads the 1st received mail record from the received mail file 25, and displays the creation data/time of this record, sender, title and mail text in the mail display area 61. Therefore, the operator can display received mail of the first record stored in the received mail file 25 in the mail display area 61 of the sub-screen area S, by touching the "MAIL" button B2.

When the received mail counter Y is "0" in ST42, the steps ST43 and ST44 will not be executed.

Next, at ST45, the main control unit 11 waits for the sub-screen area S to be touched. When the touching of any part of the sub-screen S is detected by the signal inputted from the touch panel sensor 8 to the signal input unit 16, the main control unit 11 checks whether any of the keys 62–65 of the memo display screen 60 is touched, at ST46–ST49, or the other area is touched. When the area other than the keys 62–65 is touched, the main control unit 11 resets the sub-screen area S to the sub-screen selector button display screen, at ST50, and terminates the mail key process.

Therefore, the operator can finish the display of received mail by touching the sub-screen area S other than the keys 62–65.

Contrarily, when the NEXT key 63 is touched, the main control unit 11 checks at ST51 whether the value of the display pointer P is larger than the value of the received mail counter Y. When the value of the display pointer P is smaller than the value of the received mail counter Y, the main control unit increases the value of the display pointer P by "1", at ST52, returns to ST44, reads the Pth received mail record from the received mail file 25, and displays the received date/time of this record and the mail text in the mail display area 61. When the value of the display pointer P is larger than the value of the received mail counter Y, the main control unit returns to ST44 without changing the value of the display pointer P. Therefore, the operator can sequentially display in ascending order (in the order of the creation date and time) the received mail stored in the received mail file 25 by touching the NEXT key 63.

When the BACK key 64 is touched, the main control unit 11 checks as ST53 whether the value of the display pointer P is smaller than "1". When the value of the display pointer P is larger than "1", the main control unit decreases the value of the display pointer P by "1" at ST54, returns to ST44, reads the Pth received mail record from the received mail file 25, and displays the creation date/time of this record and the mail text in the mail display area 61. When the value of the display pointer P is smaller than "1", the main control unit returns to ST44 without changing the value of the display pointer P. Therefore, the operator can sequentially display in descending order (in the reverse order of the creation date and time) the received mail stored in the received mail file 25 by touching the BACK key 64.

When the DELETE key 65 is touched, the main control unit 11 deletes the Pth received mail record from the received mail file 25 as ST55. Then, at ST56, the main control unit sequentially shifts the received mail records on and after the (P+1)th upward (in the smaller number direction). Thereafter, the main control unit decreases the value of the received mail counter Y by "1", as ST57, moves to ST58, and checks whether the value of the received mail counter Y is larger than "0". If "YES" is judged at ST58, flow moves to ST44. If "NO" is judged at ST58, flow moves to ST45. Thereafter, the operator can delete the received mail record displayed in the mail display area 61 from the received mail file 25 by touching the DELETE key 65. After the record is deleted, the received mail of the record stored next to that record will be displayed in the mail display area 61.

Figure 10:
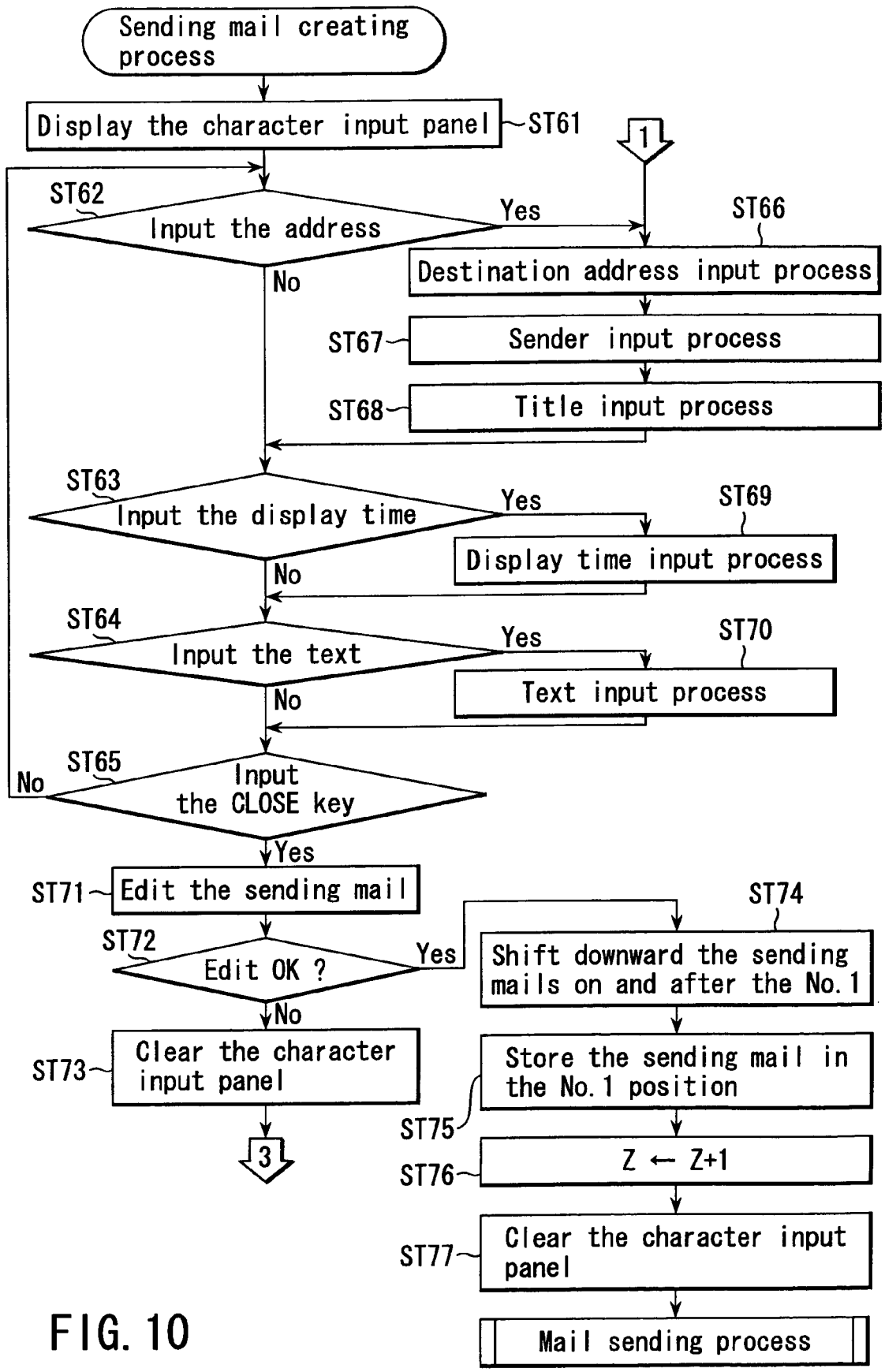
FIG. 10 is a flowchart showing concretely the sending mail creating process in the mail key operation.

When the CREATE key 62 is touched, a sending mail creation process will be executed as concretely shown in the flowchart of FIG. 10. Namely, the main control unit 11 displays a character input panel 50 over the main screen area M, at ST61, as in the message memo creation process of ST21.

Next, the main control unit 11 waits for depression of any function key 51–54 of the character input panel 50 at ST62–ST65. When the depression of the ADDRESS key 51 is detected by the signal inputted from the touch panel sensor 8 to the signal input unit 16, the main control unit performs the destination address input process, sender input process and title input process, at ST66–ST68.

The destination address input process is the process of selecting and inputting an destination address information of a sending mail among the address information (MAC address, IP address) managed for each injection molding machine 1A–1N by the address management file 31. It is also permitted to manually input the MAC address and IP address of other communication terminals connected through the network server 10, or the E-mail address set for each individual.

The sender input process is the process that the sender reads his (her) section and name managed by the staff management file 32 by inputting the staff code. The title input process is the process of taking in the characters information entered by the character keys 55 as a title of a sending mail.

Contrarily, when the depression of the DISPLAY TIME key 53 is detected, the main control unit 11 executes the display time input process as ST69. This process is to take in the digits (hour: minute) entered from the character keys 55 as a sending mail display start time.

When the depression of the TEXT key 52 is detected, the main control unit 11 executes the text input process at ST70. This process is to take in the character, digit and symbol entered from the character keys 55 as a mail text.

Contrarily, when the depression of the CLOSE key 54 is detected, the main control unit 11 edits a sending mail data having creation date/time, destination address, display time, sender, title and mail text, at ST71. The creation date/time is the current date/time indicated by the clock 13. The display time is the time of the time data when the time data has been taken in by the display time input process of ST69, and "0" otherwise. The destination address, sender and title are the characters information obtained by each of ST66–ST69. The mail text is the characters information obtained by the text input process of ST70. The sender and title can be omitted, but an error is resulted when the characters information of the destination address and mail text are not taken in.

The main control unit 11 checks at ST72 whether the sending mail data is edited or not. When the sending mail data is not edited, the main control unit clears the character input panel 50, and returns to the mail key process (FIG. 9) of ST42.

When the sending mail data can be edited, the main control unit sequentially shifts the sending mail records on and after the 1st record in the sending mail file 26 downward (in the larger number direction), stores the edited sending mail data in the empty 1st record position, and increases the value of the sending mail counter Z by "1", at ST76. Therefore, the operator can enter a sending mail as electronic data from the character input panel 50 by touching the CREATE key 62 in the mail display screen 60. The created sending mail record is stored in the sending mail file 26.

The touch panel sensor 8 functions as an input unit to input text information as electronic data in relation to the sending mail creating process of the main control unit 11.

Figure 11:
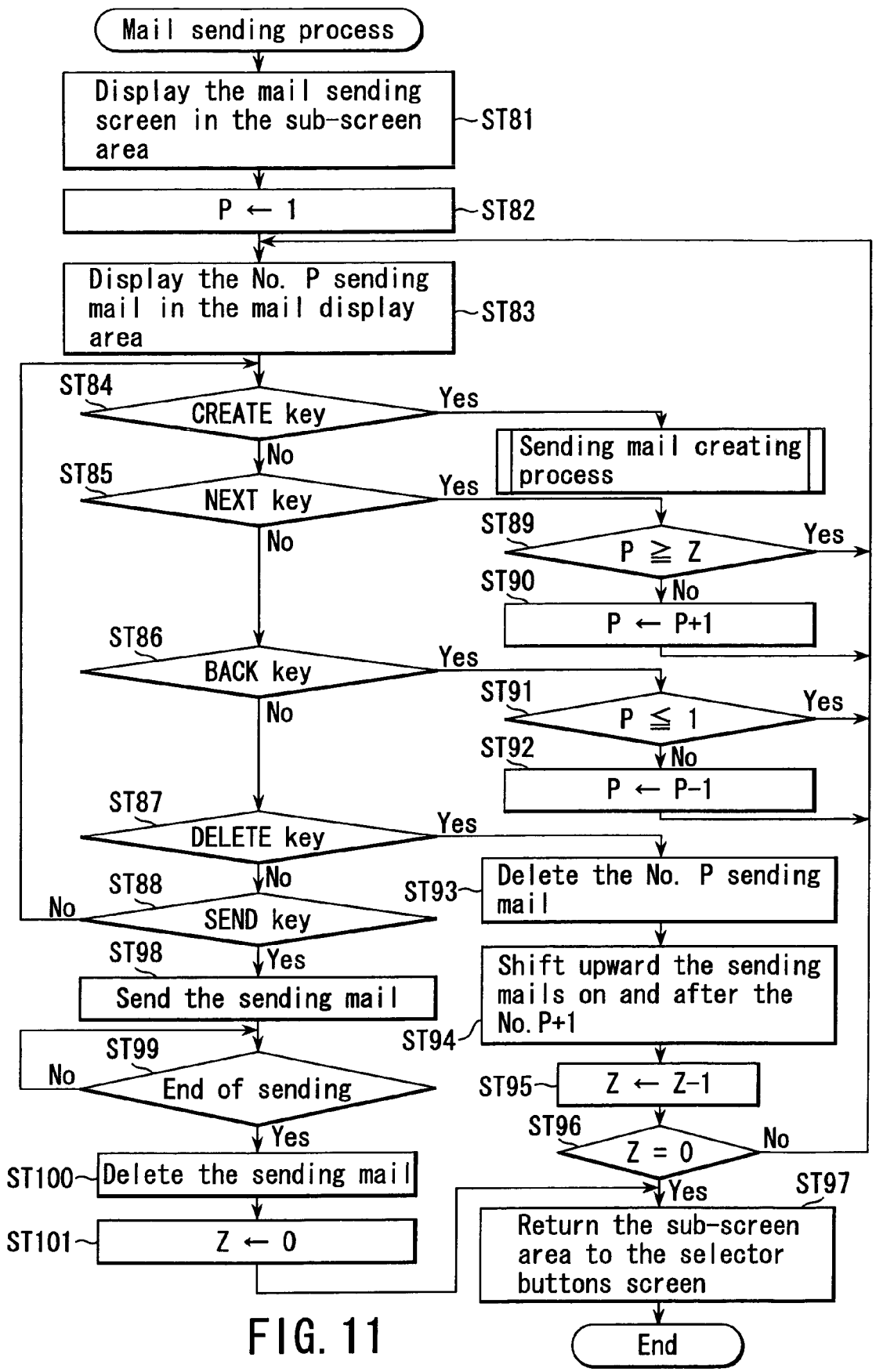
FIG. 11 is a flowchart showing concretely the mail sending process in the sending mail creating process.

Next, the main control unit 11 clears the character input panel 50, at ST77, and executes the mail sending process shown concretely in the flowchart of FIG. 11. First of all, the main control unit 11 reads the mail sending screen data from the sub-screen display data memory 22, and displays the mail sending screen 70 as shown in FIG. 17 in the sub-screen area S of the display unit 6.

The mail sending screen 70 comprises a mail display area 71 to display a sending mail reception date/time, sender, title and mail text, and the SEND key 76 in addition to the CRERATE key 72, NEXT key 73, BACK key 74, and DELETE key 75 of the mail display screen 60. The mail display area 71 permits the operator to see even a long message by scrolling the screen by a scroll bar. The "P/Z" on the right side of the mail display area 71 indicates that the sending mail displayed in the mail display area 71 is the sending mail of the Pth (the value of the display pointer P)

record among the total number Z (the value of the sending mail counter Z) of the sending mail records stored in the sending mail file 26.

Next, the main control unit 11 sets the display pointer P to "1" at ST82, reads the Pth sending mail record from the sending mail file 26, at ST83, and displays the creation date/time of this record, sender, title and mail text in the mail display area 71. Since the created sending mail is displayed in the mail display area 71 of the mail sending screen 70, the mail creator can check the mail contents by monitoring the mail display area 71.

Next, the main control unit 11 waits for any key 72–76 of the mail sending screen 70 to be touched at ST84–ST88. When the depression of the CREATE key 72 is detected, the main control unit re-executes the sending mail creating process (FIG. 10). Therefore, the operator (the mail crater) can create a second sending mail by touching the CREATE key 72.

Contrarily, when the NEXT key 73 is touched, the main control unit 11 checks as ST89 whether the value of the display pointer P is larger than the value of the sending mail counter Z. When the value of the display pointer P is smaller than the value of the sending mail counter Z, the main control unit at ST90 increases the value of the display pointer P by "1", returns to ST83, reads the Pth sending mail record from the sending mail file 26, and displays the creation date/time of this record, and mail text in the mail display area 71. When the value of the display pointer P is larger than the value of the sending mail counter Z, the main control unit returns to ST83 without changing the value of the display pointer P. Therefore, the operator can sequentially display the sending mails stored in the sending mail file 26 in the mail display area 71 in the ascending order (in the order of creation data and time) by touching the NEXT key 73.

When the BACK key 74 is touched, the main control unit 11 checks at ST91 whether the value of the display pointer P is smaller than "1" or not. When the value of the pointer P is larger than "1", the main control unit decreases the value of the display pointer P by "1", at ST92, returns to ST83, reads the Pth sending mail record from the sending mail file 26, and displays the creation date/time of this record and mail text in the mail display area 71. When the value of the display pointer P is smaller than "1", the main control unit returns to ST83 without changing the value of the display pointer P. Therefore, the operator can sequentially display the sending mails stored in the sending mail file 26 in the mail display area 71 in the descending order (in the reverse order of the creation date and time) by touching the BACK key 74.

When the DELETE key 75 is touched, the main control unit 11 deletes the Pth sending mail record from the sending mail file 26, at ST93. Then, the main control unit sequentially shifts the sending mail records on and after the (P+1)th upward (in the smaller number direction) at ST94. Thereafter, the main control unit decreases the value of the sending mail counter Z by "1", at ST95, and checks as ST96 whether the value of the sending mail counter Z becomes "0". When the sending mail counter Z is larger than "1", return to ST83. When the sending mail counter Z is "0", the sending mail data does not exist, and return the sub-screen area S to the sub-screen selector button display screen, at ST97, and terminate the mail key process. Therefore, the operator can delete the sending mail record displayed in the mail display area 71 from the sending mail file 26 by touching the DELETE key 75. When no sending mail record remains after the sending mail is detected, the mail sending process is finished.

When the SEND key 76 is touched, at ST98, the main control unit sends all sending mail records stored in the sending mail file 26 to the other operation panel controller 5 or network server 10 through the LAN 9 (text information transmission unit). When sending of all sending mail records is finished at ST99, the main control unit deletes all sending mail records stored in the sending mail file 26, at ST100, and resets the sending mail counter Z to "0", at ST101. Thereafter, the main control unit returns the sub-screen area S to the sub-screen selector button display screen, and terminates the mail key process. Therefore, the operator can send a created sending mail to each section via the LAN 9 by touching the SEND key 76.

The mail records deleted from the received mail file 25 and the sending mail file 26 are saved in the deleted log file 30, and they can be confirmed later.

Figure 12:
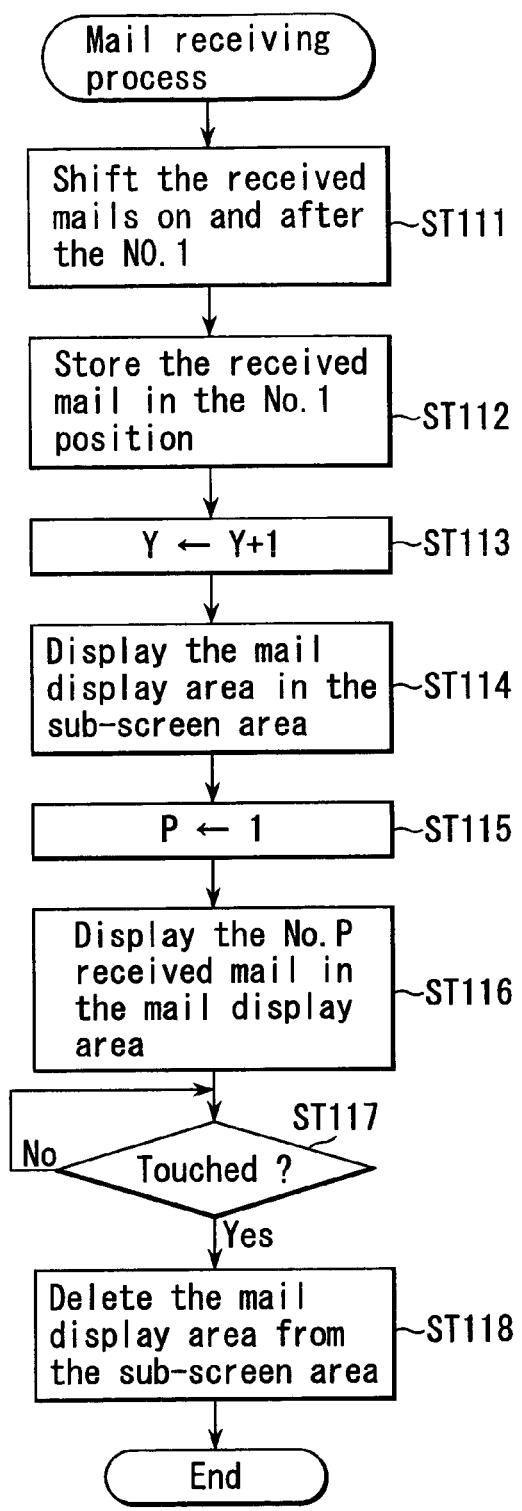
FIG. 12 is a flowchart showing the primary steps of the mail receiving process executed by the main control unit of the operation panel controller.

Further, the main control unit 11 of the operation panel controller 5 is programmed to execute the process shown in the flowchart of FIG. 12, when receiving an electronic mail data addressed to a self-address through the LAN 9 by the LAN interface 14. Namely, the main control unit 11 shifts sequentially the received mail records on and after the 1st record of the received mail file 25 downward (in the larger number direction) at ST111 and ST112, stores the received electronic mail data in the empty 1st record position, and increases the received mail counter Y by "1", at ST113.

Figure 19:
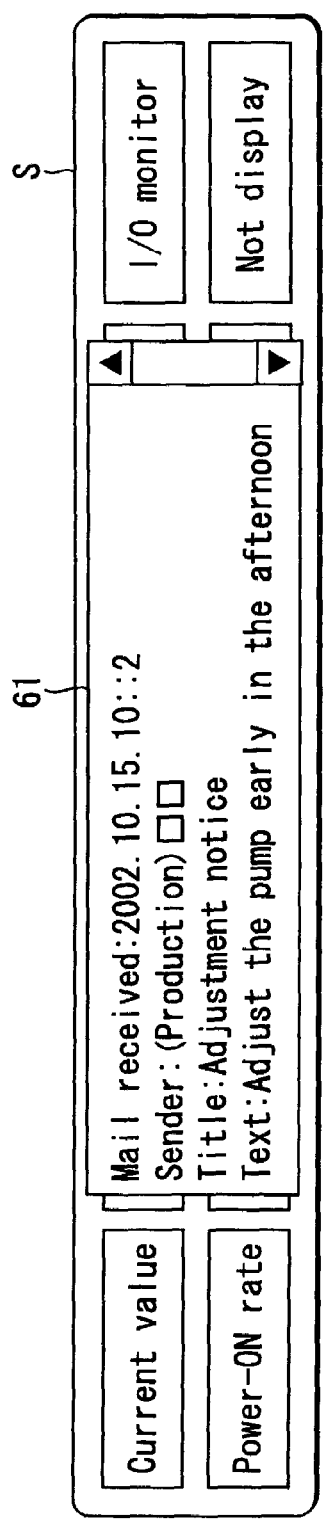
FIG. 19 is a view showing a display example of a mail display area.

Next, the main control unit 11 displays the mail display area 61 over the current screen displayed in the sub-screen area S, at ST114, as shown in FIG. 19. Then, the main control unit sets the display pointer P to "1", at ST115, reads the Pth received mail record from the received mail file 25, at ST116, and displays the reception date/time of this record, sender, title and mail text in the mail display area 61.

Then, at ST117, the main control unit waits for any one part of the sub-screen area S to be touched. When the depression of any part of the sub-screen area S is detected by the signal inputted from the touch panel sensor 8 to the signal input unit 16, the main control unit 11 deletes the mail display area 61 from the sub-screen area S, and terminates the mail receiving process.

Therefore, when an electronic mail is sent from other unit through the LAN 9, the reception data/time of the received mail, sender, title and mail text are immediately and automatically displayed in the sub-screen area S of the display unit 6 of the operation panel 4. The operator can restore the sub-screen area S by touching the sub-screen area S, after checking the mail.

The LAN interface 14 functions as a text information receiver to receive the electrified text information transferred through the network (LAN 9). The main control unit 11 functions as a display controller to display the text information received by the receiving means in the sub-screen area S.

Figure 13:
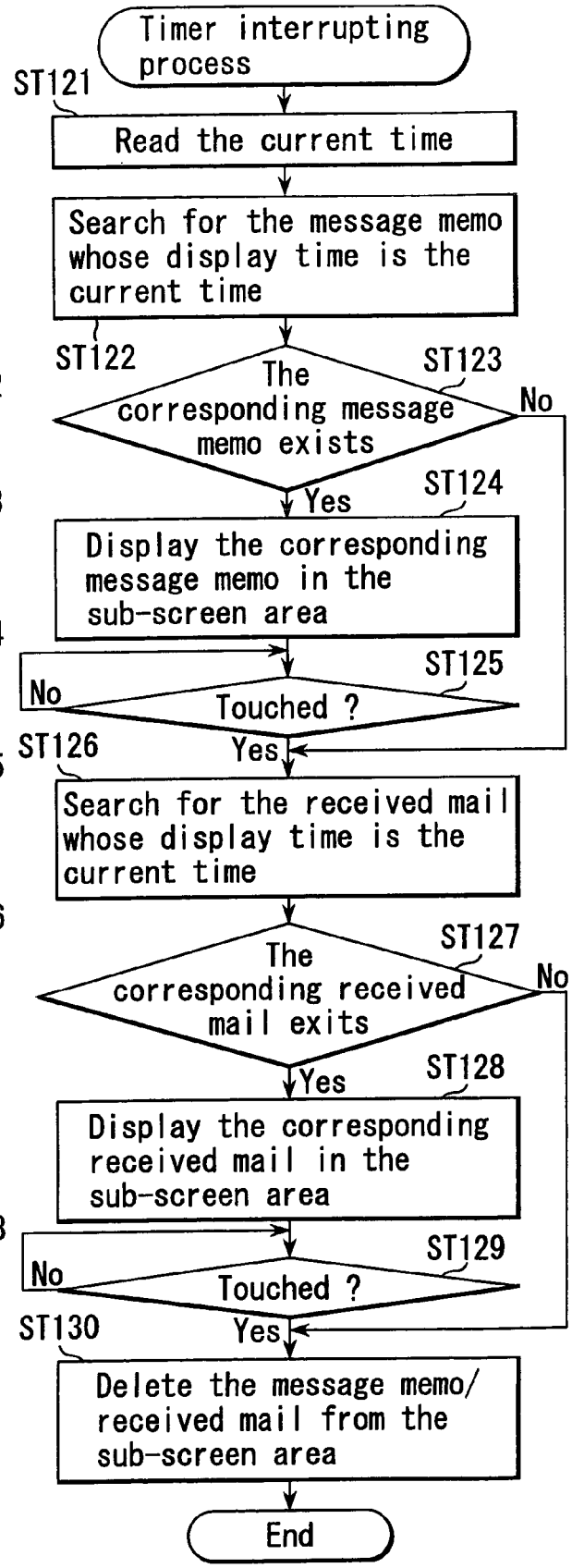
FIG. 13 is a flowchart showing the primary steps of the timer interrupting process executed by the main control unit of the operation panel controller.

Further, the main control unit 11 of the operation panel controller 5 is programmed to execute the timer interruption process shown in the flowchart of FIG. 13, corresponding to the timer interruption signal occurred whenever the time of the clock 13 elapses 1 minute, for example. The timer interruption signal occurrence interval is not limited to 1 minute, and is changeable appropriately.

After starting the interruption process, the main control unit 11 first reads the current time by the clock 13 which functions as a clocking means, at ST121.

Next, at ST122, the main control unit 11 searches the message memo file 24 for the message memo record (by a search unit) whose display time is identical to the current time. When the message memo record with the same display time as the current time is detected (YES in ST123), the main control unit 11 displays the memo display area 41 over the current screen displayed in the sub-screen area S, at ST124, as shown in FIG. 18, and displays the creation time and text of the message memo record whose display time is the same as the current time, in the memo display area 41 (a time display control unit).

Thereafter, the main control unit 11 waits for any one part of the sub-screen area S to be touched as ST125. When the depression of any part of the sub-screen area S is detected by the signal inputted from the touch panel sensor 8 to the signal input unit 16, the main control unit 11 goes to the process of ST126. When the message memo record whose display time is the same as the current time is not found (NO in ST123), the main control unit immediately goes to the process of ST126.

In ST126, the main control unit 11 searches the received mail file 25 for the received mail record whose display time is identical to the current time. When the received mail record with whose display time is the same as the current time is detected (YES in ST127), the main control unit 11 displays the mail display area 61 over the current screen displayed in the sub-screen area S, at ST128, as shown in FIG. 19, and displays the creation time and text of the received mail record whose display time is he same as the current time in the mail display area 61.

Thereafter, the main control unit 11 waits for any one part of the sub-screen area S to be touched as ST129. When the depression of any part of the sub-screen area S is detected, the main control unit 11 goes to the process of ST130. When the received mail record whose display time is the same as the current time is not found (NO in ST127), the main control unit immediately goes to the process of ST130.

In ST130, the main control unit 11 clears the memo display area 41 from the sub-screen area S. By the above operation, the main control unit 11 terminates the timer interruption process.

Therefore, if a memo creator sets a desired display time when creating a message memo by operating the character input panel 50 displayed in the display unit 6 of the operation panel 4, the message memo contents will be automatically displayed in the sub-screen area S of the display unit 6 of the same operation panel 4 at the set time. Likewise, when the set time expires, the mail contents will be automatically displayed in the sub-screen area S of the operation panel 4 at the destination of the mail.

The contents of the message memo shown in FIG. 18, for example, indicate that the material will be changed at 5:30 p.m. However, if the display time of this memo is set to 3:00 p.m. of the same day, the operator certainly remembers the next operation process at 3:00 p.m., increasing the production efficiency.

If the display end time can be set as well as the display start time, it will be possible to automatically display and clear the contents at the specified time of a message memo or electronic mail.

According to the embodiment explained hereinbefore, since the display apparatus 3A–3N, which function as a human-machine interface of the injection molding machines 1A–1N, are provided with a message memo function which can display the text information created as electronic data on the operation panel 4, the operator can securely transfer the important items concerning the injection molding machines 1A–1N set and monitored by the display apparatus 3A–3N, and the messages to the next operator who takes over the operation.

Further, since the display apparatus 3A–3N are also provided with the electronic mail function which sends the text information created as electronic data to an external system through the LAN9, and displays the electronic text information received through the LAN9 in the operation panel 4, the operators of the display apparatus 3A–3N connected to the injection molding machines 1A–1N can securely transfer the messages to one another.

In this case, the contents of message memo and received mail are displayed not in the main screen area M of the display unit 6, which is used to set the values of the molding conditions of the injection molding machines 1A–1N, and display the monitoring data, but in the sub-screen S, which displays the selector buttons screen that is used less frequently, there is no possibility of causing trouble in setting and monitoring the injection molding machines 1A–1N.

In the embodiment, when the ADDRESS button 51 of the character input panel 50 is touched in the message memo creating process of FIG. 8, the main control unit is programmed to jump to the process of ST66 in the sending mail creating process of FIG. 10. Therefore, it is possible to convert the text information inputted as a message memo into an electronic mail by inputting a destination address, sender and title, and send it to other display apparatus 3A–3N.

In the above embodiment, the message memo records on and after the first record in the message memo file 24 are sequentially shifted downward (in the larger number direction) in ST30 and ST31 of the message memo creating process shown in FIG. 8, the edited message memo data is stored in the empty first record position, and the memo number counter X is increased by "1" in ST32. The message memo record shifting process can be omitted by storing the edited message memo data in the Xth record position in the message memo file 24 after increasing the memo number counter X by "1". In this case, by setting the display pointer P not to "1" but "X" in ST3 of the memo key process of FIG. 7, the created message memo can be displayed in the memo display area 41. In this case, the message memos stored in the message memo file 24 are sequentially displayed in the order of older creation date/time when the NEXT key 43 is touched, and the message memos stored in the message memo file 24 are sequentially displayed in the order of younger creation date/time when the BACK key 44 is touched.

Likewise, in ST74 and ST75 of the sending mail creating process of FIG. 10, the sending mail records on and after the first record of the sending mail file 26 are sequentially shifted downward (in the larger number direction), the edited sending mail data is stored in the empty first record position, and the sending mail counter Z is increased by "1" in ST76. However, the sending mail record shifting process may be omitted by storing the created sending mail data in the Zth record position in the sending mail file 26, after increasing the sending mail counter Z by "1". In this case, the created sending mail can be displayed in the mail display area 71 by setting the display pointer P not to "1" but "Z" in ST43 of the mail key process of FIG. 9. In this case, the sending mails stored in the sending mail file 26 are sequentially displayed in the order of older creation date/time when the NEXT key 43 is touched, and the sending mails stored in the sending mail file 26 are sequentially displayed in the order of younger creation date/time when the BACK key 44 is touched.

Further, in ST111 and ST112 of the received mail creating process of FIG. 12, the received mail records on and after the first record of the received mail file 25 are sequentially shifted downward (in the larger number direction), the received mail data is stored in the empty first record position, and the received mail counter Y is increased by "1" in ST113. However, the received mail record shifting process can be omitted by storing the created sending mail data in the Yth record position in the received mail file 25 after increasing the received mail counter Y by "1". In this case, the received mail can be displayed in the mail display area 61 by setting the display pointer P not to "1" but "Y" in ST115.

Figure 20:
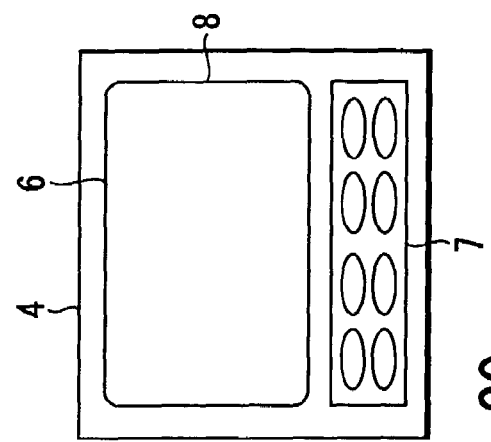
FIG. 20 is a view showing an example of not dividing the display screen of the display unit.

Further, in the embodiment, the display screen of the display unit 6 is divided into two sections, but the dividing can be omitted as shown in FIG. 20. In this case, the contents displayed in the display screen is an always-displayed main screen M described in the above-mentioned embodiment and a sub-screen S displayed in another window in response to a request.

Still further, in the above embodiment, the display screen of the display unit 6 is divided into two sections, but the screen can be divided into three or more sections. A specific one of the divided sections can be used as a text information display screen to display text information.

Figure 21:
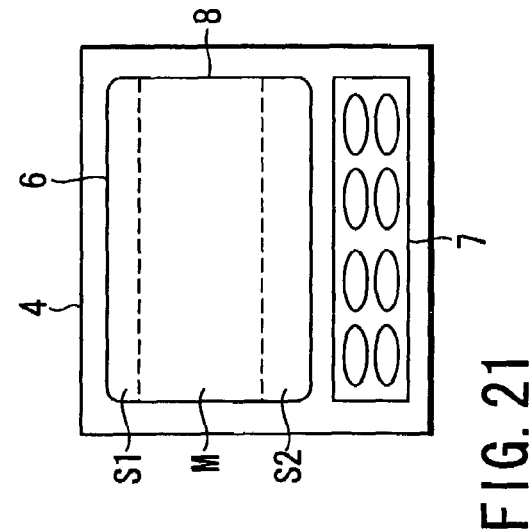
FIG. 21 is a view showing an example of diving the display screen of the display unit into three sections.

For example, FIG. 21 shows an example of dividing the display screen of the display unit 6 into three sections, a main screen M, a first sub-screen S1 and a second sub-screen S2. When the display screen is divided into three sections like this, the display contents of the main screen M are the same as those of the main screen M explained in the above-mentioned embodiment, the display contents of the first sub-screen S1 are the same as those of the sub-screen S explained in the above-mentioned embodiment (except the display of text information), and the second sub-screen S2 is to be used as a specific display screen to display text information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus of an injection molding machine, which functions as a human-machine interface, comprising:
    an input unit which inputs text information as electronic data;
    a memory which stores the electronic data of the text information inputted from the input unit;
    an instruction unit which instructs to display the text information; and
    a display control means which displays the electronic text information stored in the memory in a display screen of the display apparatus according to the instruction from the instruction unit,
    wherein the display screen of the display apparatus is divided into two or more spatially separate sections that are arranged to be simultaneously readable within said display screen, one of these two or more sections being used to display the text information input by the input unit.

2. The display apparatus of an injection molding machine according to claim 1, wherein the display apparatus has a selector button display screen to select various data; and wherein the display screen to display text information is used also as a selector button display screen.

3. The display apparatus of an injection molding machine according to claim 1, further comprising:
    a time setting unit which sets a time to display text information;
    a clock which maintains a current time;
    a search unit which searches the data stored in the memory for the text information whose display time is a current time; and
    a time display control unit which displays the text information in the display screen when the search unit searches the text information whose display time is a current time.

4. The display apparatus of claim 1 of an injection molding machine according to claim 1, wherein one of these two or more sections that is used to display text information is configured to display memo text information or email text information that is received through a network.

5. A display apparatus of an injection molding machine, which functions as a human-machine interface, comprising:
    a text information receiving unit which receives electronic text information created and transferred through a network; and
    a display control unit which displays the text information received by the receiving unit in a display screen of the display apparatus,
    wherein the display screen of the display apparatus is divided into two or more spatially separate sections within said display screen that are arranged to be simultaneously readable, one of these two or more sections being used as a display screen to display the text information created and transferred through the network.

6. The display apparatus of an injection molding machine according to claim 5, wherein the display apparatus has a selector buttons display screen to select various data; and the display screen to display text information is used also as a selector buttons display screen.

7. The display apparatus of an injection molding machine according to claim 5, further comprising:
    an input unit which inputs text information as electronic data; and
    a text information transfer unit which transfers the electronic data of the text information inputted by the input unit through the network.

8. A display apparatus of an injection molding machine, which functions as a human-machine interface, comprising:
    a memo button that causes text information to be displayed;
    a memo display screen which is displayed in the display apparatus when the memo button is operated, the memo display screen having a memo display section to display text information, a selector key to select text information to display in the memo display section, and a create key to create text information;
    a character input panel which is displayed in the display apparatus when the create key is operated, the character input panel having a character key to input characters and a display time key to set a display time;
    a memory which stores the electronic data of the text information inputted by the character input panel; and
    a display control unit which displays the text information electrified and stored in the memory and selected by the selector key in the memo display section.

9. The display apparatus of an injection molding machine according to claim 8, wherein the display screen of the display apparatus is divided into two or more sections, one of these two or more sections being used as the memo display screen.

10. The display apparatus of an injection molding machine according to claim 9, wherein the display apparatus has a selector button display screen to select various data; and wherein the memo display screen is used also as a selector button display screen.

11. The display apparatus of an injection molding machine according to claim 8, further comprising:
   a clock which maintains a current time;
   a search unit which searches the data stored in the memory for the text information whose display time is a current time; and
   a time display control unit which displays the text information whose display time is a current time in the display screen, when the search unit searches that text information.

12. A display apparatus of an injection molding machine, which functions as a human-machine interface, comprising:
   a mail button which instructs to display a mail;
   a mail display screen which is displayed in the display apparatus when the mail button is operated, the mail display screen having a mail display area to display a mail, a selector key to select a mail to display in the mail display area, and a create key to create a mail;
   a character input panel which is displayed in the display apparatus when the create key is operated, the character input panel having a character key to input characters and a display time key to set the display time;
   a memory which stores the electronic data of the mail inputted from the character input panel; and
   a display control unit which displays the mail electrified and stored in the memory selected by the selector key in the mail display area.

13. The display apparatus of an injection molding machine according to claim 12, wherein the display screen of the display apparatus is divided into two or more sections, one of these two or more sections being used as the mail display screen.

14. The display apparatus of an injection molding machine according to claim 13, wherein the display apparatus has a selector buttons display screen to select various data; and the mail display screen is used also as a selector buttons display screen.

* * * * *